(12) United States Patent
Chandrasekaran et al.

(10) Patent No.: US 11,465,060 B2
(45) Date of Patent: Oct. 11, 2022

(54) PARTIES FROM CHAT

(71) Applicant: Roblox Corporation, San Mateo, CA (US)

(72) Inventors: Deepak Murali Chandrasekaran, San Mateo, CA (US); Guruprasath Krishnamurthy, Sunnyvale, CA (US); Peter John Phillips, San Francisco, CA (US)

(73) Assignee: Roblox Corporation, San Mateo, CA (US)

( * ) Notice: Subject to any disclaimer, the term of this patent is extended or adjusted under 35 U.S.C. 154(b) by 801 days.

(21) Appl. No.: 15/092,210

(22) Filed: Apr. 6, 2016

(65) Prior Publication Data
US 2017/0291111 A1 Oct. 12, 2017

(51) Int. Cl.
*A63F 13/87* (2014.01)
*A63F 13/35* (2014.01)

(52) U.S. Cl.
CPC ............. *A63F 13/87* (2014.09); *A63F 13/35* (2014.09)

(58) Field of Classification Search
CPC ........... A63F 13/87; A63F 13/35; A63F 13/48
See application file for complete search history.

(56) References Cited

U.S. PATENT DOCUMENTS

| | | | | |
|---|---|---|---|---|
| 9,805,067 | B1 * | 10/2017 | Cottrell | G06F 17/30283 |
| 2005/0181878 | A1 * | 8/2005 | Danieli | A63F 13/12 463/42 |
| 2006/0015560 | A1 * | 1/2006 | MacAuley | A63F 13/87 709/206 |
| 2007/0167225 | A1 * | 7/2007 | Nguyen | A63F 13/795 463/29 |
| 2007/0230374 | A1 * | 10/2007 | Altberg | H04M 7/0036 370/271 |
| 2008/0300045 | A1 * | 12/2008 | Ratcliff | G07F 17/3276 463/25 |
| 2011/0212767 | A1 * | 9/2011 | Barclay | G07F 17/3225 463/25 |
| 2013/0090170 | A1 * | 4/2013 | Reed | A63F 13/12 463/42 |

* cited by examiner

*Primary Examiner* — Thomas H Henry
(74) *Attorney, Agent, or Firm* — IP Spring

(57) ABSTRACT

A gaming system runs on a server executing software, and provides a first interactive interface to a first player, enabling the first player to establish a chat session as a chat leader, to invite a plurality of other players to the chat session, to select a game provided by the system from the at least one game server, and to launch the game with the chat leader and the other players in the chat session as players in the game, and provides a second interactive interface to players in the chat session as a result of invitation, the second interactive interface enabling the players in the chat session other than the leader to participate in the chat session, and to play the game selected and launched by the chat leader, who becomes a lead player in the game.

20 Claims, 4 Drawing Sheets

PARTIES FROM CHAT

BACKGROUND OF THE INVENTION

1. Field of the Invention

The present invention is in the field of consumer online gaming and pertains particularly to methods and apparatus for initializing an online game between game players engaged in a chat session.

2. Discussion of the State of the Art

In the field of interactive online gaming, users subscribe to a game provider service in order to play interactive games on the Internet. Such services often involve membership services and include social interaction services that gamers may utilize to connect with one another in chat, game play, club membership, and the like.

In current online gaming applications, players typically select a game to enter from a Web page that advertises the games. Such advertisements may include an interactive Play icon to enable players to enter a game. When a player enters a game, the service provider may determine from a number of distributed game servers, to which game server a player will be connected to play the selected game. Players may invite other players to play a game and may establish online friendships with other players they meet while playing.

Along with playing the games, players may engage in chat sessions with other players. Chat sessions with game players may include simple social chat interactions, chat-based forums, and other themes, where chat sessions may be set up around such as game building and other activities. However, any player that wants to invite other players into a game may be required to send a personal invitation to the invited player or players. In this case there may be no confirmation as to whether or not invited players will join a game.

Therefore, what is clearly needed is a game initiation platform that may be hosted in a socially interactive session, such as from a chat session conducted between a number of players.

BRIEF SUMMARY OF THE INVENTION

In one embodiment of the invention a gaming system is provided, comprising a network-connected server executing software on a processor from a non-transitory medium, a server interface establishing connection to computerized, Internet-capable devices used by game players, and at least one game server enabled to serve games to be played to players using the computerized devices. Execution of the software provides a first interactive interface served by the network-connected server to a first player, the first interactive interface enabling the first player to establish a chat session as a chat leader, to invite a plurality of other players to the chat session, to select a game provided by the system from the at least one game server, and to launch the game with the chat leader and the other players in the chat session as players in the game, and a second interactive interface served by the network-connected server to players in the chat session as a result of invitation by the first player, the second interactive interface enabling the players in the chat session other than the leader to participate in the chat session, and to play the game selected and launched by the chat leader, who becomes a lead player in the game.

In one embodiment the first player, through the first interactive interface, is enabled to search for and select other players who are subscribers to the gaming system. Also in one embodiment the first player is enabled to view and select from games presented as available by the system in the first interactive interface. Also in one embodiment the system presents games as available according to pre-programmed criteria. In one embodiment the system uses information about players, recorded in player's profiles, in selecting games to be presented as available in the first interactive interface.

In one embodiment the lead player is enabled through the first interactive interface to move other players into and out of the game. Also in one embodiment the players in the game other than the lead player are enabled through the second interactive interface to leave and rejoin the game being played. And in one embodiment the lead player is enabled by the first interactive interface to leave the game being played, following which the system determines and establishes one of the other players as lead player, serving the first interactive interface to the new lead player.

In another aspect of the invention a method is provided, comprising enabling a first player through an interactive interface provided to an Internet-capable computerized device used by the first player, by a network-connected server executing software on a processor from a non-transitory medium, to establish a chat session as a chat leader, to invite a plurality of other players to the chat session, to select a game provided by the system from at least one game server, and to launch the game with the chat leader and the other players in the chat session as players in the game, and enabling the other players through a second interactive interface served by the network-connected server to players in the chat session as a result of invitation by the first player to participate in the chat session, and to play the game selected and launched by the chat leader, who becomes a lead player in the game.

In one embodiment of the method the first player, through the first interactive interface, is enabled to search for and select other players who are subscribers to the gaming system. Also in one embodiment the first player is enabled to view and select from games presented as available by the system in the first interactive interface. Also in one embodiment the system presents games as available according to pre-programmed criteria. In one embodiment the system uses information about players, recorded in player's profiles, in selecting games to be presented as available in the first interactive interface.

In one embodiment of the method the lead player is enabled through the first interactive interface to move other players into and out of the game. Also in one embodiment the players in the game other than the lead player are enabled through the second interactive interface to leave and rejoin the game being played. And in one embodiment the lead player is enabled by the first interactive interface to leave the game being played, following which the system determines and establishes one of the other players as lead player, serving the first interactive interface to the new lead player.

DETAILED DESCRIPTION OF THE INVENTION

In various embodiments described in enabling detail herein, the inventors provide a unique system enabling online game play to members of an active chat session. The present invention is described in enabling detail using the following examples, which may describe more than one relevant embodiment falling within the scope of the present invention.

Figure 1:
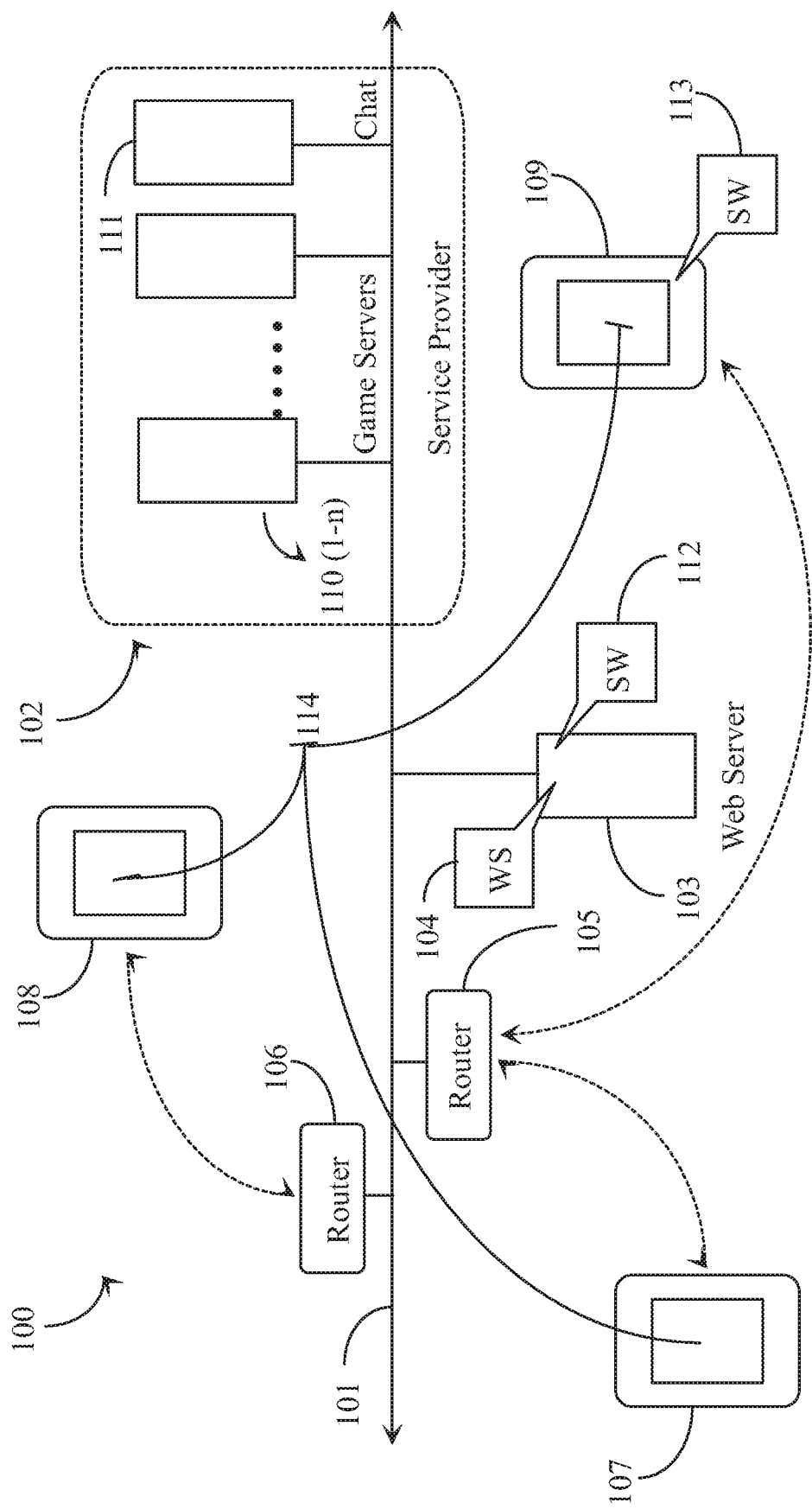
FIG. 1 is an architectural overview of a gaming network supporting game launch from a chat session according to an embodiment of the present invention.

FIG. 1 is an architectural overview of a gaming network 100 supporting game launch from a chat session according to an embodiment of the present invention. Gaming network 100 includes the Internet network represented herein by a network backbone 101. Backbone 101 is intended to represent all of the lines, equipment, and access points that make up the Internet network as a whole including any connected sub-networks. Therefore, there are no geographic limitations to the practice of the present invention.

Backbone 101 supports a domain of a gaming service provider 102. Service provider 102 provides online gaming to network consumers such as those operating gaming devices depicted herein as device 107, device 108, and device 109. Backbone 101 supports game servers 110 (1-n) for storing and serving games to players. Game servers 110 (1-n) may be in some embodiments geographically distributed over the network for latency or other purposes.

Service provider 102 may maintain a Website (WS) 104 hosted on a Web server 103. Web server 103 may be a third-party server or maintained by the service provider 102 without departing from the spirit and scope of the present invention. WS 104 represents an access point for online game players to play games served by game servers 110 (1-n). Players may register for game play services and may partake in social interaction with other players through WS 104. Service provider 102 in one embodiment maintains at least one chat server 111 adapted to host chat sessions created by players patronizing the service. Chat server 111 may be a third-party server without departing from the spirit and scope of the present invention.

Players operating devices 107, 108, and 109 may connect to backbone (Internet) 101 through one or more routers such as routers 105 and 106 depicted in this example. In this example, players connect wirelessly from any wireless sub-network or carrier network. In other embodiments, players may also connect from tethered computing appliances. Gaming devices 107, 108, and 109 may include a mobile SW application 113 for wireless devices that provides a mobile friendly utility to connect with WS 104 and game servers 110 (1-n).

In this example, players operating devices 107, 108, and 109 have a chat session 114 in progress in which they are actively participating. Chat session 114 may be hosted by chat server 111. In this implementation, chat session 114 has a chat leader or administrator (one of the players) wherein more than two players have been invited to the chat session and are currently active in the chat session. Website 104 may include SW 112 for interleaving game services available through the site with the chat presentation SW 114. In one implementation, SW 112 may be hosted on chat server 111. SW 112 is enabled in one embodiment to provide game play options to a lead player whom has created a group chat and has an intention of inviting all or some of the group to play a game launched directly from the chat session window 114.

In practice of the present invention, a player such as one operating one of devices 107-109 may create a group chat inviting, typically more than one other player. The group chat session 114 recognizes the initiator of the session as the session leader. The session leader may be served a list of available games to play. This service may be dependent upon the leader indicating a desire to launch a game such as by clicking on an available gaming link in the chat session window. In one implementation the session leader is the only session participant that can see gaming links.

A gaming link may be an interactive list of current games served into the leader's chat window with the aid of WS SW 112 hosted on server 103. Such a list may be expanded in the chat window to see individual game items. The list may be searchable and scrollable to enable a player that is the chat leader to select a game to initiate from the chat session. In one implementation, the other players that are invited to the chat session by the session leader are all game players and are all automatically invited to play any game that the chat leader selects. In another implementation, the chat leader may select from the group of chat participants those that will be invited to play a game that the leader selects, but not all of the participants may be invited.

Once the chat leader has selected a game to play, it may be launched directly from chat window 114. The other players participating in the chat may be automatically inserted into the selected game by default. In one implementation, there may be an opt-out option before insertion of a player into a game. Such an option may be presented to each invited player prior to game selection or just after game selection by the session leader without departing from the spirit and scope of the present invention. In one implementation, a group denotes a group of players that are selected by the chat leader where some of the selected players may not be invited or may not accept a play invitation while chatting. In another implementation, a "party" is created using the same dynamics to create a group chat, but the players making up the party have already previously agreed to play anytime a game is launched into the instant chat session.

It is noted herein that players who are in a game still have access to their chat windows and may leave a game they are currently playing by clicking on a "departure" icon provided in the chat window or within the game itself. It may be noted that leaving the game may not result in exiting the current chat session. It may also be noted that the lead player controlling game play may leave the chat session, resulting in automatic selection via the chat software (112) of a subsequent chat leader, which in one embodiment may be one that has the most time in the session. In other embodiments, other criteria for selecting a leader once a first leader has departed may vary. Therefore, the system may assign leadership to another player in chat, and may upon acceptance by the new leader, send game options to the new leader for continued game play.

It is noted that game options sent to a chat leader may include free games, advertised games, most popular games, and other game categories. Moreover, game lists sent to chat session leaders may be culled or custom created according to information known about the particular chat leader and chat group participants including player's game histories, player demographics, and profile data about players that are active in the chat session being serviced. Further, based on such information, games may award handicaps, extra points, extra fuel, extra weapons, or some other specified game amenities to players based upon the knowledge about the particular players in a chat session being serviced.

Figure 2:
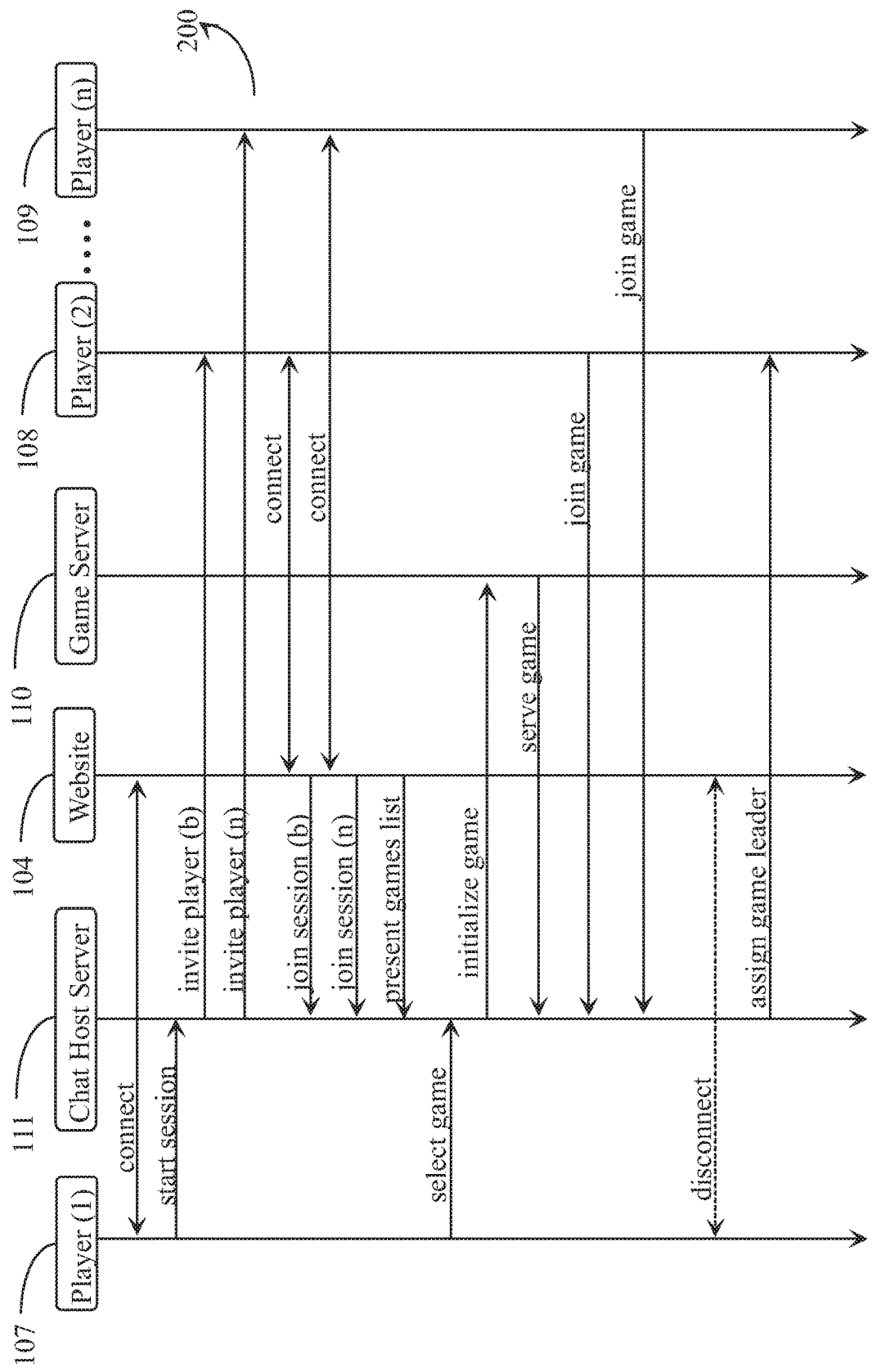
FIG. 2 is a sequence diagram depicting interaction between components relative to launching a game from a chat session.

FIG. 2 is a sequence diagram 200 depicting interaction between components relative to launching a game from a chat session. Sequence diagram 200 depicts Website 104, a game server 110, a chat server 111, and players 107, 108, and 109. In this example of interaction, player 107 is a chat leader. Players 107, 108, and 109 are also labeled players (1-n) indicative of the possibility of more than three players involved in a group chat session.

In this sequence player 107 establishes a secure connection to Website 104. This may include authentication procedures. It should be noted that connection to website 104 is necessary for the player to start a chat session, and for other players to join a chat session in embodiments of the invention. While connected, player 107 may start a chat session through Website 104, the chat session hosted on chat server 111. A group or party chat session may be initiated by the player through manipulation of a chat list of friends available to player 107. Therefore, player 107 invites or controls server invites of player 108 and 109 (players 2-n). It is noted herein that a group chat may be set up on the fly with invitation of players who are already connected online, or it may be scheduled for a future date where those invited players may or may not be online at the time invitations are sent.

In this exemplary sequence, players 108 and 109 connect with Website 104 and join the group chat session at the start of the session. It may also be noted herein that players may leave a group session or may join the session at a later time. Once the group chat session is in progress, player 107 (chat leader/creator) may determine to launch a game from within the chat interface presenting on the personal device of the player. Player 107 may click on a link within the interface to cause Website 104 to serve an interactive game list to the chat session hosted on server 111. The games list may include interactive game options including play buttons to enter those games. The list may be customized to the preponderance of group, or simply to player 107. Game links may be visible to chat leaders but transparent to other members of the chat.

Player 107 may search games, browse games, or simply select from a presented list or a short list of "top 5 games" for example. Once player 107 selects a game, it is initiated at the chat server, the server opening a connection to an active game server 110. Game server 110 may be a routing target among multiple game servers that may be available. In one embodiment, Website 104 may maintain a proxy roll in mediating communication between the game server and the chat server. In another implementation the chat server connects directly with the game server and bypasses the Website.

Game server 110 serves the game to the chat host server 111. Player 107 may automatically be inserted into the game when the game is served. All of the invited players are also immediately inserted into the game as long as they have not declined or ignored the invitation. In one implementation, it is previously assumed that all parties to the group chat are expecting to be inserted into a game from the chat window. In another implementation, a player/chat leader may preselect specific players from within a created and active group chat session where only those players see the invitations and may have an option of ignoring a received invitation. A game leader may switch from one game to another game during a chat session where invitees may be automatically "transferred" into and out of different games as the leader navigates in a follow-the-leader fashion. Likewise, a leader may pass leadership over to someone else in the group.

Players who are playing through the chat interface may leave a game, transferring back to chat only, or jump back into the game from chat. In one embodiment, players active in play of a game may still chat through a game extension while actively playing the game if the game allows for it. In one implementation, the chat session hosted on server 111 is a public chat server where a chat leader may volunteer to select and launch games for any other player in the chat room. For example, a service provider may offer to service a chat interface temporarily and to provide free game play in exchange for allowing it to advertise gaming membership. There are many possibilities.

In this implementation, player 107 may disconnect from the Website chat session and game-play leaving no one to continue game selection and play. In this case, the chat host server may assign gaming leadership for the current chat session to another player such as player 108. Some rules system may be observed such as passing the game leadership to the next oldest (time in session) chat session participant (player) who may be the next chat leader to be able to select and initialize games.

Figure 3:
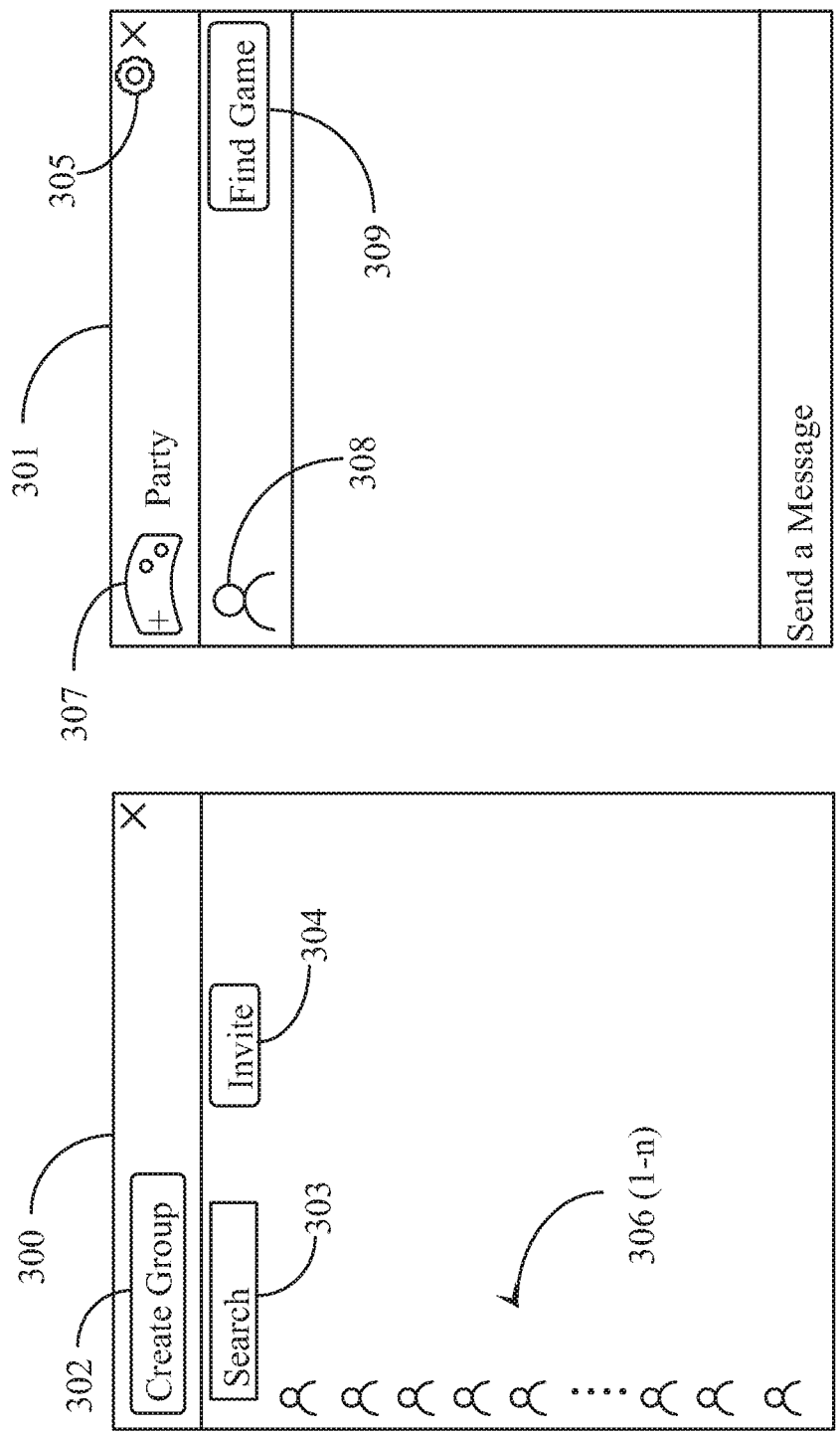
FIG. 3 is a plan view of chat session windows used for setting up a group chat and launching a game from the current session.

FIG. 3 is a plan view of chat session windows 300 and 301 used for setting up a group chat and launching a game from the current session. Chat window 300 may be served to a player that desires to create a group session and to use that session to play games with other chat participants. Window 300 may be used to start one-on-one chats or group chats. Window 300 includes an interactive option for creating a group chat session. A list of the player's friends may be presented as friends 306 (1-n). It is noted herein that friends 306 (1-n) may include entries which include all of the invited friends of a previous group session.

It was described above that a group session may include multiple session participants where only a portion of these might be invited to follow a leader in game play. A "party session" may be a group session where all of the invitees expect to be transferred into games selected by the game leader. Window 300 includes a search field 303 enabling the lead player to search for friends by name or to handle invitation into a group chat. Window 300 includes an interactive invite button 304 to send invitations to all of the checked entries in the "friends list" depicting friends 306 (1-n).

Chat window 301 appears when the chat session is launched. A chat leader 308 represents the person that created the chat session and so is assigned to be leader of that session. Window 301 may include an interactive button 309 for finding a game. Activation of option 309 may bring up a list of games from which to select. Games may be presented in a number of different ways. A games page may appear with search and browse options, a summary list of the most popular games, a list of free games, a list of advertised or sponsored games, a list of most recent games played, and so on.

When player 308 selects a game for service, an invitation button (not illustrated) may be provided to enable selection of specific chat participants in the group session to invite to play the game. A "party" button 307 may be clicked on to immediately launch all of the invited gamers and the leader as a party into the selected game. In an embodiment where all of the group participants are expected to follow the leader into a selected game, the leader may simply hit Party 307 after selecting the game. It is noted herein that there may be new arrivals into the group chat after a game has been started. These new players may, if invited, join the ensuing gaming activity by clicking on a party button (307) in their own chat window. Window 301 includes an exit option 308 for any user to leave either an ensuing game or the group chat, or both.

In one implementation, a player leading a game in a group chat may exit the game and chat session by clicking on exit option 308. In this case, another player may be automatically assigned to be the new chat and game leader. This determination may be made by seniority such as the player having the second most amount of time in the group session. Other such routines may be observed without departing from the spirit and scope of the invention. In one implementation, a leader may start a game with multiple group invitees and then subsequently exit that game to start another game, inviting yet other group of players to play the second game. The first game may continue without the leader as long as a minimum number of invited players are still active.

In a variation of this implementation, the leader may invite a player who is still playing the first game into a second game, in some cases, causing automatic transfer or "beaming" of the player from one game directly into the other. In this way two or more games may be played by group participants with the leader being able to roam between and direct through invitation who plays which games. Players may exit games and the chat session at will as well as new players coming on board under certain circumstances which may be dictated by design and rule set. For example, entry to the group chat may not be subject to invite, so that other players may drop in to chat and perhaps be invited to play a game by the current game leader.

Figure 4:
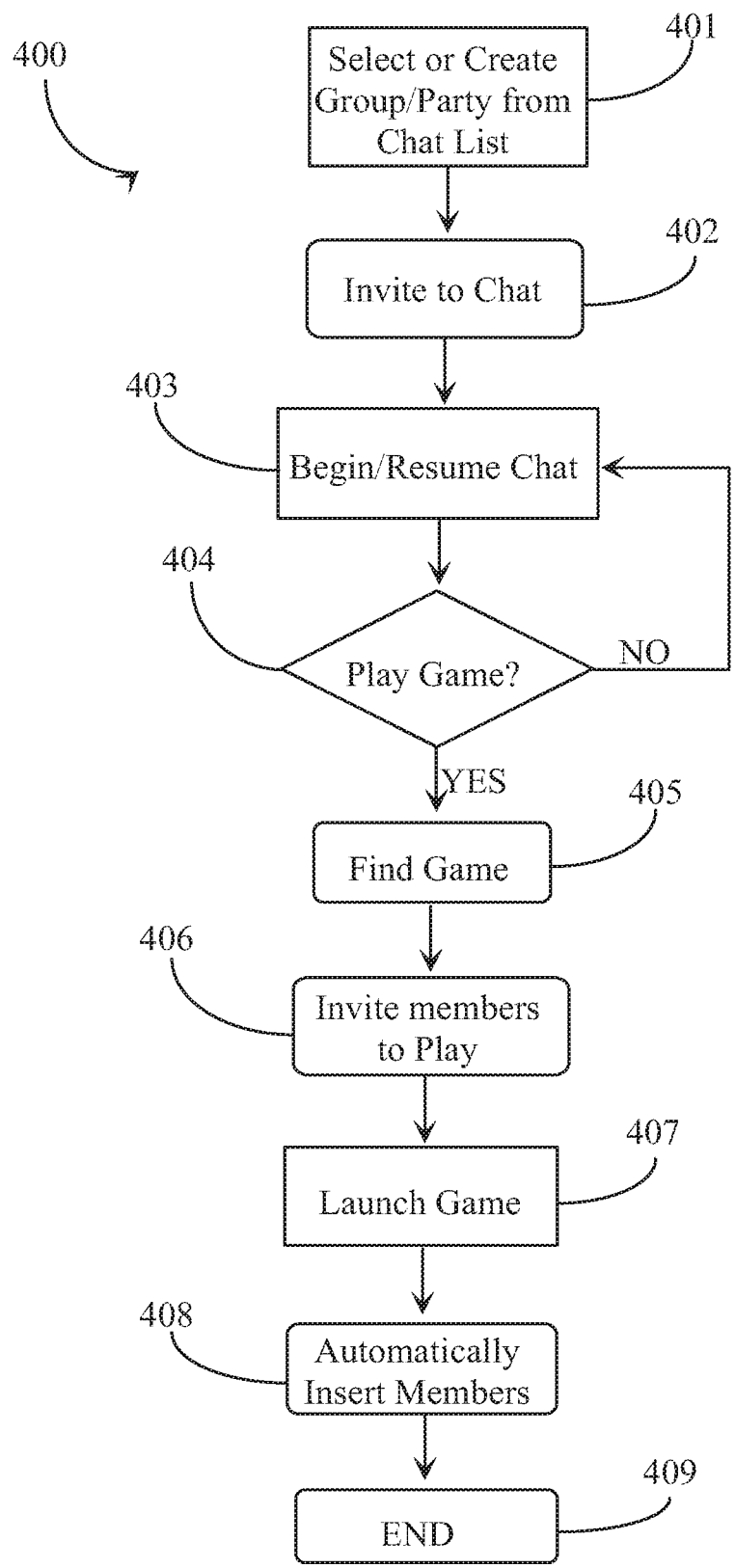
FIG. 4 is a process flow chart depicting steps for creating a chat group and launching a game from the current session.

FIG. 4 is a process flow chart 400 depicting steps for creating a chat group and launching a game from the current session. It is assumed in this example that a player is logged into a Website such as Website 112 of FIG. 1. At step 401, a player selects or creates a group or party from a chat menu expanded from a chat option button available on a gaming Website such as Website 112. At step 402, the player may select friends from a friends list that is part of the chat menu. In one aspect there may be existing groups of friends referenced in the player's friends list, which upon selection thereof includes all of the friends in that group. Also at step 402, the player selects an invitation button to invite all of the "selected friends" into the group chat.

At step 403, the group chat begins and a chat window appears. In this step, the initiating player is a game leader who is able to select and launch games from the chat window. At step 404, the player may decide whether to play a game. If the player is not ready to play a game at step 404, the process may resolve back to step 403 where normal group chat is resumed.

If the player determines to play a game at step 404, the player may find a game to launch at step 405. A game may be selected from a games list expanded as a result of selecting the option to find a game at step 405. Games may be searched, browsed, or otherwise presented in groups, or lists, categories, etc. without departing from the spirit and scope of the invention. In some aspects, games may be suggested or recommended to the player based upon information about the player, the group session and the invited parties to the group session. Such information may include profile data about players including recent game histories, levels attained, virtual currency spent or saved, etc. In one aspect, a group may be started for the purpose of playing one game that is popular among all the members and may be the only available game without departing from the spirit and scope of the invention.

The player may invite group members at step 406 to play the selected game found at step 405. In one aspect, all group members are automatically invited because they accepted the chat invitation and entered the chat session. In another aspect, the player may select from available chat participants and invite a particular fraction of the total group of participants. Game invitations may be handled in the same manner as invitations to chat simply by selecting them and clicking on an invitation button to notify them. In one aspect, an invitation to play a game may be ignored by a chat participant, and before a game may be launched, a minimum number of players must have accepted the invitations.

In one implementation, step 406 is not required, as in the case where a group or party is only formed of players who fully expect to play following the lead player's authority of selection of a game and subsequent launch of the game at step 407. Launch of a selected game at step 407 automatically inserts all of the players or group members at step 408 along with the lead player into the selected game. In one aspect, where smaller numbers of total session participants are invited into a game, the lead player may exit a game and start another game with a new list if invitees that might include others whom may be playing the first game. If enough members continue playing in the first game, it may remain active until the minimum number of players required to play the game has been breached through players leaving the game.

It will be apparent to one with skill in the art that group chat or "game party" sessions may be public events or private events without departing from the spirit and scope of the invention. Groups or parties may also be saved for replay by updating the lead player's friends list with the group names and list of members. In one aspect, two groups in a player's friends list may be merged to form a larger group by inviting both groups to a new group chat session and then after game play saving the new group in the friends list overwriting the old groups (or not). In one aspect, a player may have the tools in the interface to manage the friends list and may have the ability to "save" new groups to be replayed later when again staring a group session where game play is available.

In one use case, a player who is a mentor and part of the company marketing games may hold group "play" seminars from a chat server where invitees are selected from a general population to review or to learn or practice to play new games. There are many possible embodiments.

It will be apparent to one with skill in the art that the chat-based gaming system of the invention may be provided using some or all of the mentioned features and components without departing from the spirit and scope of the present invention. It will also be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

The invention claimed is:
1. A gaming system, comprising:
a server that executes software on a processor from a non-transitory medium, wherein the server hosts a web site;

a chat server interface, accessible via the website, that establishes a connection to computerized devices used by game players who are registered members of the gaming system; and at least one game server, remote and separate from the computerized devices used by the game players, accessible via the website, that stores and streams a plurality of games to the game players that use the computerized devices, wherein execution of the software provides an interactive interface served at the website by the chat server interface and accessed by a first player, wherein the interactive interface enables the first player to establish a chat session as a chat leader that is a member of the chat session, wherein the chat session is displayed on a computerized device of the first player as a chat session window provided by the interactive interface, wherein the interactive interface enables the first player as the chat leader:
to invite a plurality of other game players to be other members of the chat session,
to select a first game to be streamed by the at least one game server to individual ones of the computerized devices used by the other game players, wherein the interactive interface presents the first game as a selectable game link in a list of game links, and wherein the game links are visible to the chat leader but are transparent to the other members of the chat session,
to launch the first game directly from the chat session window by connecting the computerized device of the first player with the at least one game server as a lead player in the first game, and
to choose from options to:
automatically navigate into the first game as active players in the first game, via a selection of a party, all of the other members of the chat session who are in the party; and
select less than all of the other members of the chat session to which to send an invitation to join the first game, wherein members that accept their respective invitation to join the first game are inserted into the first game as active players, and wherein a minimum number of invitations is required to be accepted by invited members before the first game is launched, and wherein the interactive interface enables the lead player to leave the first game being played, after which the gaming system:
selects another game player having a next oldest time in the chat session as a new lead player,
serves the interactive interface to the computerized device of the another game player, and
gives an opportunity to the another game player to accept or decline the selection as the new lead game player.

2. The gaming system of claim 1, wherein the interactive interface enables the first player, through the chat session window, to search for and select additional game players, who are also registered members of the gaming system, and to automatically navigate the additional game players into the first game.

3. The gaming system of claim 1, wherein the interactive interface enables the first player to view and select a second game from games presented as available by the gaming system in the chat session window.

4. The gaming system of claim 3, wherein the interactive interface enables the first player to select the other game players and additional game players to enter the first game or the second game, and wherein the interactive interface enables only the first player to navigate freely between the first game and the second game while maintaining display of the chat session window in both the first and second games during game play.

5. The gaming system of claim 4, wherein the gaming system uses information about the other game players, recorded in respective game player profiles, in selecting games to be presented to the first player as available to select in the chat session window.

6. The gaming system of claim 4, wherein the interactive interface enables the lead player, through the chat session window, to move one or more of the other game players and the additional game players into and out of the first and second games.

7. The gaming system of claim 1, wherein the interactive interface enables the active game players in the first game other than the lead player through the chat session window to leave and rejoin the first game being played.

8. The gaming system of claim 1, wherein members of the chat session that decline, ignore, or are not sent the invitation to join the first game are excluded from being active players of the first game.

9. A method, comprising:
presenting an interactive interface, in a website hosted by a gaming system that streams multi-player games, to a computerized device used by a first player who is a registered member of the gaming system;
providing a link in the interactive interface that enables the first player to establish a chat session, wherein the chat session is displayed in a chat session window provided by the interactive interface and the chat session window is displayed on the computerized device used by the first player, and wherein the chat session establishes the first player as a member of the chat session and as a lead player;
inviting to join as other members of the chat session, by the lead player, a plurality of other players who are also registered members of the gaming system and who use respective computerized devices;
providing command inputs in the chat session window that enable the lead player to select, from a list of game links that are visible to the lead player but are transparent to the other members of the chat session, a game from a game server, and to launch the game directly from the chat session window displayed on the computerized device used by the first player by connecting the computerized device used by the first player with the game server;
providing options in the chat session window to enable the lead player to:
automatically navigate into the game as active players in the game, via a selection of a party, all of the other members of the chat session who are in the party, and
select less than all of the other members of the chat session to which to send an invitation to join the game, wherein members that accept their respective invitation to join the game are inserted into game as active players, and wherein a minimum of invitations is required to be accepted by invited members before the game is launched; and displaying the chat session window on a respective computerized device of each of the active players during game play of the game on the respective computerized device,
wherein the interactive interface enables the lead player to leave the game being played, after which the gaming system:
selects another game player having a next oldest time in the chat session as a new lead player,
serves the interactive interface to the another game player, and
gives an opportunity to the another game player to accept or decline the selection as the new lead player.

10. The method of claim 9, wherein the interactive interface enables the lead player, through the chat session window, to search for and select additional players who are registered members of the gaming system, and to automatically navigate the additional players into the game.

11. The method of claim 9, wherein the game is a first game, and wherein the interactive interface enables the lead player to view and select a second game from games presented as available by the gaming system in the chat session window.

12. The method of claim 11, wherein the interactive interface enables the lead player to select additional players to enter the first game or the second game, and wherein the lead player navigates freely between the first game and the second game while maintaining the chat session window in both the first and second games during game play.

13. The method of claim 12, wherein the gaming system uses information about the other players, recorded in respective player profiles, in selecting games to be presented to the lead player as available to select in the chat session window.

14. The method of claim 12, wherein the interactive interface enables the lead player through the chat session window to move one or more of the other players and the additional players into and out of the first and second games.

15. The method of claim 9, wherein the interactive interface enables the active players in the game other than the lead player, through the chat session window, to leave and rejoin the game being played.

16. The method of claim 9, wherein the interactive interface enables the first player to initiate a link to select players who are registered members of the gaming system, wherein the gaming system in response displays a list of players who are associated as friends of the first player, and wherein the interactive interface enables the first player to select one or more players among the list of players and to send an invitation to selected friends from the list of players to join a group to play the game.

17. The method of claim 16, wherein the interactive interface enables the first player to initiate a link to select the game to be played by the group, wherein in response, the gaming system displays lists of games ordered by different criteria, and wherein the interactive interface enables the first player to select the game from any one of the lists of games.

18. The method of claim 9, wherein the interactive interface enables the first player to initiate a link to select the game to be played, wherein in response, the gaming system displays lists of games, and wherein the interactive interface enables the first player to select a game from any one of the lists of games.

19. A system, comprising:
a server that hosts a website;
a chat server interface, accessible via the website, that establishes a connection to computerized devices used by players; and
at least one game server, accessible via the web site, that stores and streams a plurality of games to the players that use the computerized devices,
wherein the website presents an interactive interface that streams multi-player games to a computerized device used by a first player;
wherein the interactive interface provides a link that enables the first player to establish a chat session, wherein the chat session is displayed in a chat session window provided by the interactive interface and the chat session window is displayed on the computerized device used by the first player, and wherein the chat session establishes the first player as a member of the chat session and as a lead player;
wherein the interactive interface enables the first player to invite other players to be other members of the chat session;
wherein the chat session window includes command inputs that enable the lead player to select, from a list of game links that are visible to the lead player but are transparent to the other members of the chat session, a game from the at least one game server, and to launch the game directly from the chat session window displayed on the computerized device used by the first player by connecting the computerized device used by the first player with the at least one game server;
wherein the chat session window includes options to enable the lead player to:
automatically navigate into the game as active players in the game, via a selection of a party, all of the other members of the chat session who are in the party, and
select less than all of the other members of the chat session to which to send an invitation to join the game, wherein members that accept their respective invitation to join the game are inserted into game as active players, and wherein a minimum number of invitations is required to be accepted by invited members before the game is launched,
wherein the chat session window is displayed on a respective computerized device of each of the active players during game play of the game on the respective computerized device, and
wherein the interactive interface enables the lead player to leave the game being played, after which:
another game player having a next oldest time in the chat session is selected as a new lead player,
the interactive interface is served to the computerized device of the another game player, and
the interactive interface gives an opportunity to the another game player to accept or decline the selection as the new lead player.

20. The system of claim 19, wherein all of the other members who are in the party have previously agreed to play the game anytime that the game is launched from the chat session window.

* * * * *